J. W. BARNES.
Fertilizer.
No. 15,876.
Patented Oct. 14. 1856.
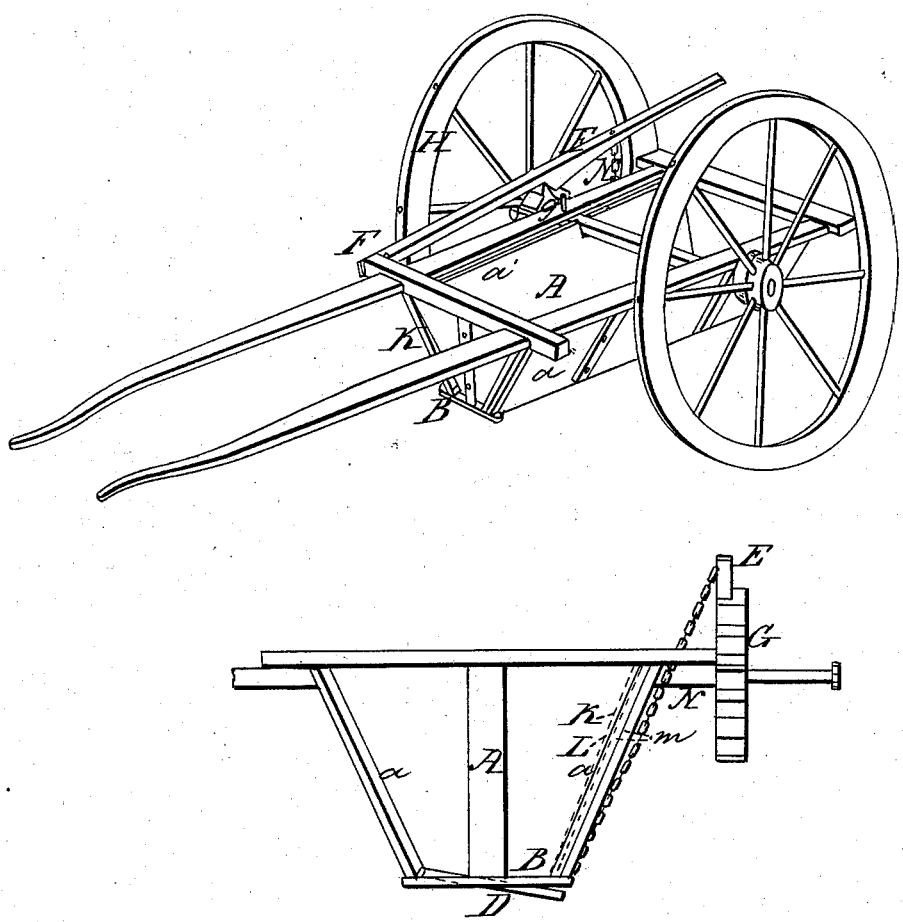

UNITED STATES PATENT OFFICE.

J. W. BARNES, OF MURFREESBOROUGH, NORTH CAROLINA.

IMPROVED MANURE-DISTRIBUTER.

Specification forming part of Letters Patent No. 15,876, dated October 14, 1856.

*To all whom it may concern:*

Be it known that I, J. W. BARNES, of Murfreesborough, in the county of Hertford and State of North Carolina, have invented an Improvement in Machines for Distributing Manure; and I do hereby declare that the following is a full, clear, and exact description of the principle or character which distinguishes it from all other things before known, and of the usual manner of making, modifying, and using the same, reference being had to the annexed drawings, of which—

Figure 1 represents a perspective view of the wagon; Fig. 2, an end view with the wheels removed.

My improvement consists in a wagon for distributing coarse manure, constructed as herein described.

A is the body of the wagon, with inclined sides $a\ a'$. The side $a$ is fixed and the side $a'$ is hinged at its lower edge, B, to the bottom sill of the cart. The bottom D of the cart is hinged to the opposite bottom sill of the cart. The lever E, jointed at F, rests upon the tappet-wheel G, attached to the driving-wheel H.

Outside of the hinged side $a'$ is a bar or winged piece, K, pivoted to the uprights of the wagon, one of which is shown at L. On this wing-piece is a projection, M, to which is secured a chain, N. This chain is attached by its lower end to the hinged bottom D, and its upper end to the lever E. It will readily be seen that as the tappet-wheel revolves the lever is raised and lowered by the action of the tappets and gives vibratory motion to the bottom D and side $a'$ of the wagon. By graduating the length of the chain the amount of manure escaping through the open bottom can be regulated.

The action of the hinged bottom is not claimed as new, but it is the combined action of the side with that of the bottom. The side throws the manure over, separates, and prevents the opening at the bottom from choking.

What I claim is—

The hinged side $a'$, combined with the hinged bottom, as set forth.

J. W. BARNES.

Witnesses:
T. CAMPBELL,
EZRA MARQUISS.